Aug. 27, 1929.  O. H. HANSEN  1,726,297
APPARATUS FOR TREATING KRAUT
Filed April 23, 1923   3 Sheets-Sheet 1
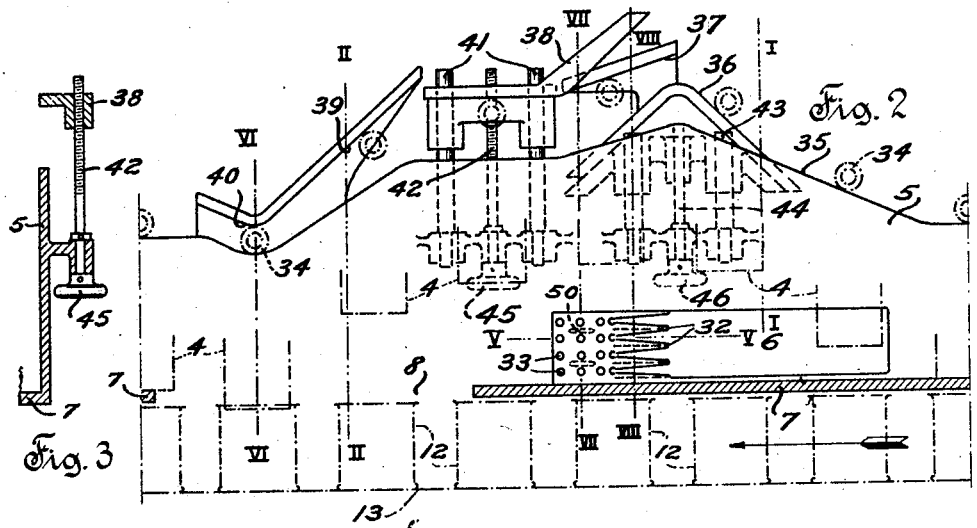
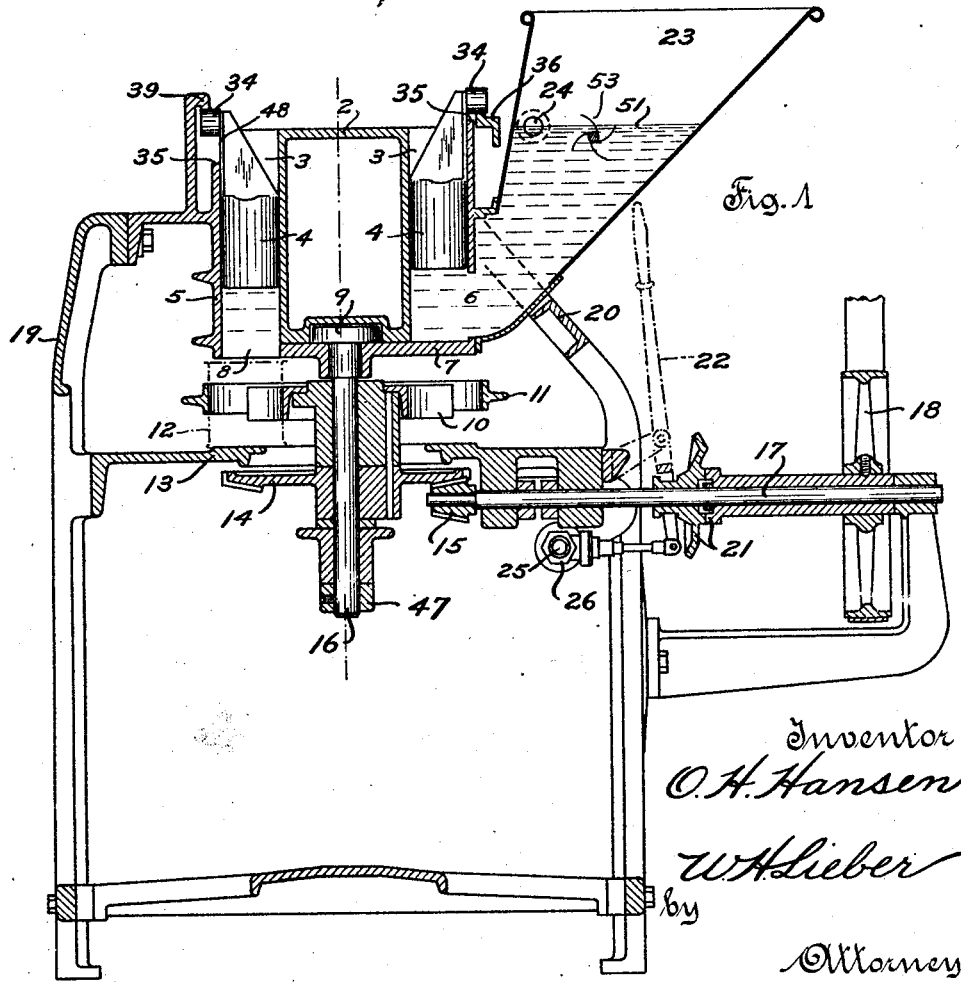
Inventor
O. H. Hansen
W. H. Lieber
by
Attorney Aug. 27, 1929.  O. H. HANSEN  1,726,297
APPARATUS FOR TREATING KRAUT
Filed April 23, 1923    3 Sheets-Sheet 2
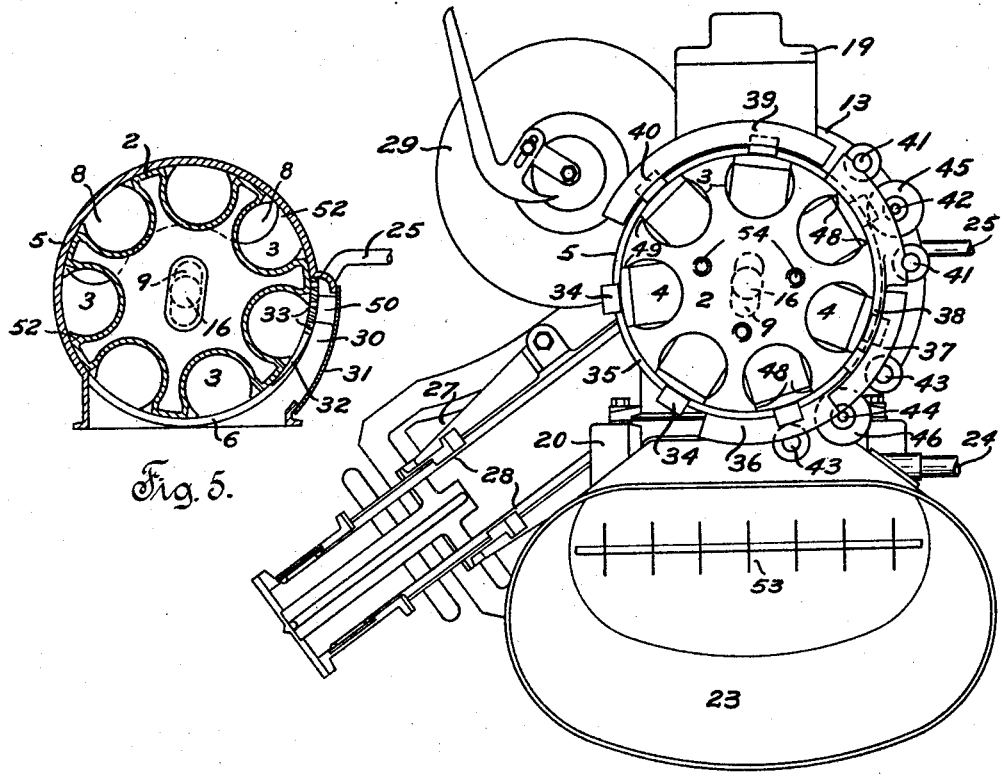
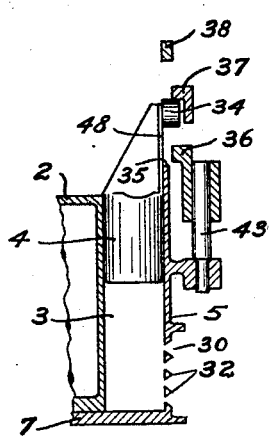
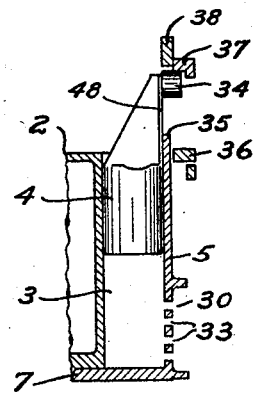
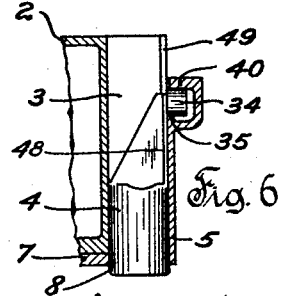

Aug. 27, 1929. O. H. HANSEN 1,726,297
APPARATUS FOR TREATING KRAUT
Filed April 23, 1923  3 Sheets-Sheet 3

Inventor
O. H. Hansen
W. H. Lieber
by
Attorney

Patented Aug. 27, 1929.

1,726,297

UNITED STATES PATENT OFFICE.

OSWALD H. HANSEN, OF PORT WASHINGTON, WISCONSIN, ASSIGNOR TO HANSEN CANNING MACHINERY CORPORATION, OF PORT WASHINGTON, WISCONSIN, A CORPORATION OF WISCONSIN.

APPARATUS FOR TREATING KRAUT.

Application filed April 23, 1923. Serial No. 634,196.

This invention relates in general to improvements in the art of treating fibrous food products, and relates more specifically to improved apparatus for preparing and effectively packing stringy substances such as sauer kraut.

In the commercial production of high grade canned food products, it is extremely desirable to secure absolute uniformity of pack, that is, to produce successive filled cans or other receptacles which contain the same weight of substance, in which the batches of material have like proportions of ingredients, in which the material has uniform quality, and in which the product has been effectively sterilized. The unusual characteristics of sauer kraut have heretofore prevented attainment of desirable uniformity in pack of this substance, even when utilizing the tedious and relatively slow hand pack method now universally used. When sauer kraut is disposed in bulk in the curing vats prior to being placed into the cans, the material at the bottom of the mass is compressed considerably more than that at the top, and hence weighs more per unit volume than the upper material. This characteristic of the kraut makes it impossible to secure uniformity of weight with the hand pack process unless each batch is accurately weighed or unless each can is filled with kraut which has been subjected to the same pressure. In order to secure commercial speed of packing, while at the same time insuring sufficient weight of material to meet government requirements, it is the present practice to completely fill the successive cans with a few ounces more material than necessary and to pay no special attention to uniformity of weight. The sauer kraut in the curing vats also varies considerably in percentage of moisture, in color and in taste or flavor, thereby making it practically impossible to obtain the desired uniformity of proportions of ingredients and of quality when employing the prior hand pack method of filling. As sauer kraut is capable of resisting rapid transfer of heat therethrough, it is desirable to pack the substance as hot as possible in order to reduce to a minimum the necessary time for effective sterilization of the packed product. With the prior hand pack process the material must necessarily be handled in relatively cold condition in order to avoid burning the operators.

The present invention contemplates provision of improved apparatus for automatically, rapidly and efficiently exploiting the processes hereinafter referred to. In accordance with the present improvement, the highly heated sauer kraut is deposited in bulk in a bath of brine wherein it is automatically bleached and uniformly flavored while the fibres or shreds are simultaneously separated to produce a mixture of kraut and brine of uniform consistency. Successive equal batches of the mixture are then withdrawn from the bath and are segregated from the mass of material in the bath with the aid of an improved shredding device. The separated batches are subsequently compressed to remove excess brine, after which the batches are delivered to the cans which either prior to or after being capped or closed have their preliminarily heated contents subjected to final sterilization.

A clear conception of the several steps of the improved processes and of the details of construction and of operation of a device embodying the present improvements, may be had by referring to the drawings accompanying and forming a part of this specification in which like reference characters designate the same or similar parts in the various views.

Fig. 1 is a compound vertical sectional view of a kraut filler, the section through the measuring device to the left of the central vertical axis being taken along the line II—II of Fig. 2 and the section through the measuring device to the right of the axis being taken along the line I—I of Fig. 2.

Fig. 2 is a development of the stationary cylinder wall and of the plunger actuating cams, the plungers and cans being shown in dot and dash lines.

Fig. 3 is a radial sectional view showing details of the movable cam adjusting mechanism.

Fig. 4 is a top view of the improved kraut filling machine.

Fig. 5 is a transverse horizontal section through the material measuring and delivering mechanism, the section being taken through the measuring pocket inlet openings.

Fig. 6 is a fragmentary vertical radial section taken along the line VI—VI of Fig. 2.

Fig. 7 is a fragmentary vertical radial section taken along the line VII—VII of Fig. 2.

Fig. 8 is a fragmentary vertical radial section taken along the line VIII—VIII of Fig. 2.

Figure 10:
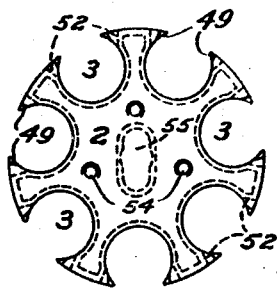
Fig. 10 is a top view of the measuring pocket rotor.
Figure 11:
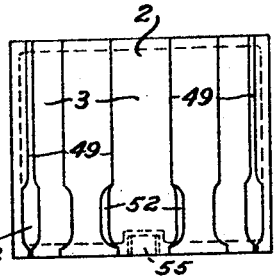
Fig. 11 is a front view of the measuring pocket rotor.
Figure 14:
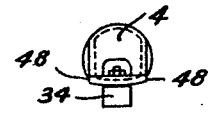
Fig. 14 is a top view of one of the measuring plungers.
Figure 12:
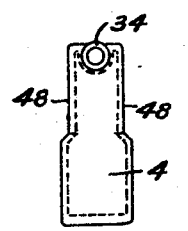
Fig. 12 is a front elevation of one of the measuring plungers.
Figure 13:
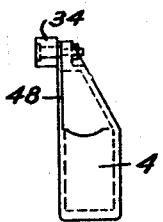
Fig. 13 is a side elevation of one of the measuring plungers.
Figure 9:
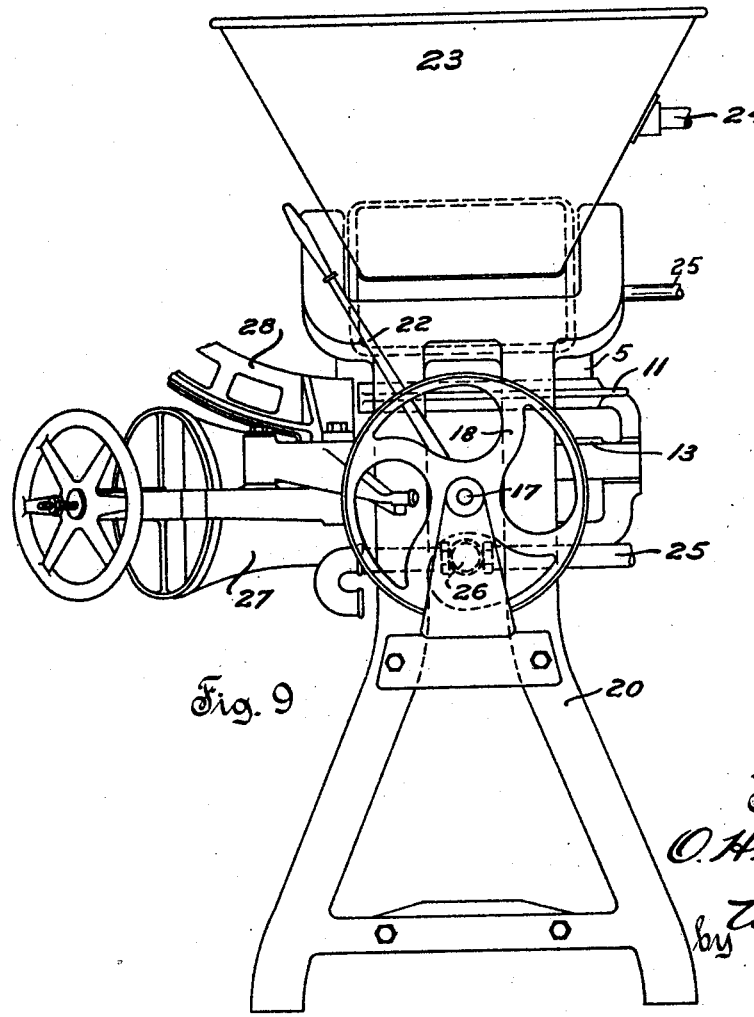
Fig. 9 is a side view of the improved kraut filling machine looking toward the supply hopper.

While the several processes are described specifically in connection with one form of apparatus only, such disclosure is not to be considered as limiting the scope of any feature of the invention. The kraut filler herein illustrated comprises in general kraut treating, measuring and delivering apparatus; can supplying, transportating and discharging mechanism; power means for operating the apparatus and mechanism; and suitable frames for supporting the apparatus, mechanism and the power means.

The kraut treating apparatus consists of a stationary supply hopper 23 having therein a liquid or brine bath 51 of considerable depth, means forming a chamber 30 extending laterally from the bottom of the bath 51, a brine supply pipe 25 communicating with the bath 51 through the chamber 30, a brine control valve 26 located in the supply pipe 25, a brine overflow pipe 24 communicating with the hopper 23 at the top of the bath 51, and an agitator 53 for disintegrating the kraut delivered to the bath 51. The kraut measuring and delivering apparatus consists of a stationary annular wall 5 having a stationary bottom plate 7, a rotary measuring element 2 having therein a series of seven equally spaced measuring pockets 3 located within the wall 5 and resting upon the bottom plate 7, a series of seven vertically movable plungers 4 within the pockets 3, and cams for reciprocating the plungers 4 during rotation of the element 2. The lower end of each of the plungers 4 is bounded by two intersecting segmental cylindrical surfaces one of which has a radius of curvature equal to one half of the major diameter of the pocket and the other of which has a radius equal to that of the element 2. The stationary wall 5 has a lateral elongated inlet opening 6 communicating directly with the bath 51 in the hopper 23, and the bottom plate 7 is provided with a downwardly directed elongated discharge opening 8. The portion of the opening 6 within the chamber 30 is partially closed by means of a removable plate having elongated triangular sectioned shredding points 32 thereon and also having a plurality of brine return holes 33 therein. This plate is connected with a removable side plate 31 by means of ribs 50, whereby the plate may be conveniently removed. The rotary element 2 is provided with a plurality of tapped holes 54 at its upper end for effecting convenient removal of the element from within the wall, and has an elongated driving socket 55 in the bottom thereof. Each of the pockets 3 has a segmental cylindrical bounding surface and a pair of parallel vertical surfaces 49 at its upper outer portion intersecting the cylindrical surface and adapted to coact with parallel vertical surfaces 48 formed at the upper end of a complementary plunger 4, the coacting surfaces 48, 49 serving to guide the plungers and to prevent rotation thereof within the pockets 3. The lower outer portion of each pocket 3 is laterally widened to form an enlarged outwardly directed opening 52, the openings 52 being successively communicable with the liquid bath 51 through the inlet opening 6. The vertically movable plungers 4 have their upper extremities provided with actuating rollers 34 which are cooperable with the successive cams 35, 36, 37, 38, 39, 40 to periodically reciprocate the plungers 4 within the pockets 3. The continuous cam 35 is formed directly upon the upper extremity of the annular stationary wall 5. The adjustable lower and upper cams 36, 37 are formed integral and are vertically movable along stationary parallel guide rods 43 by means of an adjusting screw 44 which is manipulable with the aid of a hand wheel 46. The adjustable top cam 38 is vertically movable along stationary parallel guide rods 41 by means of an adjusting screw 42 which is manipulable with the aid of a hand wheel 45. The stationary top cam 39 may be secured directly to the wall 5 and has a topping cam portion 40 which defines the lower limit of travel of the plungers 4. The relative positions of the plungers 4 with their actuating rollers 34 coacting with the several cams are indicated in dot and dash lines in Fig. 2.

The can supplying, transporting and discharging mechanism consists of a continuously rotating can feed drum 27 co-operating with a can supply chute 28, a stationary support 13 for receiving the successive empty cans 12 from the feed drum 27 and for supporting the cans during filling, a revolving series of can hooks 10 for urging the cans 12 in succession along the support 13, a removable can guide 11 for preventing movement of the cans 12 away from the can hooks 10 during filling, and discharge mechanism 29 for delivering the filled cans 12 from the filler to the closing machine.

The power means for operating the kraut measuring and delivering apparatus and the can supplying, transporting and discharging mechanism, consists of a vertical main shaft 16 supported in suitable stationary bearings and having at its upper end an elongated transverse driving head 9 which fits within the driving socket 55 in the bottom of the element 2. A removable collar 47 secured to the lower end of the shaft 16 prevents upward displacement of the shaft. The main bevel gear 14 is rigidly attached to the medial portion of the shaft 16 by means of a key, and is drivingly connected to the can hooks 10 by means of one or more driving rods as shown in Fig. 1. A bevel pinion 15 meshes with the gear 14 and is secured to the inner end of the horizontal power shaft 17 which is also mounted in suitable stationary bearings. The main driving pulley 18 is secured to a sleeve which is rotatably supported upon the horizontal shaft 17 and which is also capable of being drivingly connected with the shaft 17 by means of a jaw clutch 21. The location of the pulley 18 is such that a vertical driving belt coacting therewith will not interfere with the supply hopper 23. The jaw clutch 21 is manipulable by means of the operating lever 22 which is also adapted to operate the brine control valve 26. The can supply and discharge mechanisms are also operable by the power means, in a well known manner.

The kraut, brine and can handling and manipulating mechanisms are all suitably supported by means of stationary vertical side frames 19, 20 and a series of horizontal cross frames connecting the vertical frames. These frames are of well known construction and require no detailed description.

During normal operation of the improved kraut filler the several steps of the improved processes are performed automatically as will be apparent from the following description. The power applied at the driving pulley 18 is transmitted through the jaw clutch 21 and horizontal drive shaft 17 to the gears 15, 14 and produces continuous rotation of these gears. The rotary motion of the main gear 14 is transmitted directly to the vertical main shaft 16 and to the can hooks 10, and is also transmitted to the can feed drum 27 and to the can discharge mechanism 29 in an obvious manner. The rotary motion of the vertical shaft 16 is transmitted through the driving head 9 to the measuring pocket element 2, which is caused to rotate continuously and at definite speed in a counter clockwise direction as viewed in Figs. 4, 5 and 10. The agitator 53 is also being rotated in any convenient manner and a regulated quantity of brine is admitted to the liquid bath 51 through the supply pipe 25 and valve 26 which has been opened simultaneously with the application of the power and which is capable of adjustment to produce a predetermined flow by varying the length of the rod connecting the valve slide with the lower end of the lever 22. The brine thus admitted is preferably in highly heated condition, and a slight amount of brine is ordinarily being discharged through the overflow 24. With the various mechanisms operating in this manner, the empty cans 12 are delivered in succession from the supply chute 28 upon the feed drum 27 which gently delivers the cans in succession upon the can support 13 and into the path of the successive can hooks 10 which transport the cans along the inner wall of the can guide 11. The cans 12 thus supplied are disposed directly below and in vertical alinement with the successive measuring pockets 3 of the rotating element 2.

The sauer kraut is admitted in highly heated and variably compressed condition to the supply hopper 23 and is initially broken up by the rotating agitator 53. As the kraut descends by gravity through the liquid in the bath 51, the fibres are automatically separated and a mixture of kraut and brine of uniform consistence is produced. The descending kraut in passing through the bath of brine is also automatically uniformly flavored and bleached being in highly desirable condition for packing when it reaches the bottom of the bath 51.

As the successive measuring pockets 3 approach the lateral inlet opening 6 in the stationary annular wall 5, the pocket openings 52 are automatically brought into communication with the bath 51 and the plungers 4 are simultaneously elevated by virtue of coaction of the actuating rollers 34 with the upwardly inclined portion of the stationary cam surface 35 of the wall 5 shown at the right of Fig. 2. The ascending plungers 4 automatically withdraw measured charges of mixture of kraut and brine from the bath 51 into the successively advancing pockets 3, by suction and below the level of the mixture in the bath 51. The extent of upward movement of the plungers 4 is determined by the position of the adjustable cam 36 upon which the rollers 34 ride from the cam surface 35 as shown in Fig. 2. When the successive pockets 3 reach positions directly adjacent to the shredding points 32, the plungers 4 reach their highest positions as indicated by the peak of the cam 36, and full charges of mixture are disposed within the measuring chambers of the pockets 3. During advancement of the successive pockets 3 past the points 32, the plungers 4 are caused to descend slightly by virtue of transference of the actuating rollers from the cam 36 to the cam 37, and the points 32 automatically tear the measured batches of kraut away from the main body of mixture in the bath 51, without appreciably cutting the fibres.

When the pockets 3 have passed the shredding points 32, the measuring chambers are automatically segregated from the basin 51 except for the relatively small holes 33. The displacement plungers 4 are then caused to descend a predetermined amount depending upon the position of adjustment of the top cam 38 to the surface of which the rollers 34 are automatically transferred. The descending plungers 4 force a definite amount of the brine from the measured batches of mixture through the discharge holes 33 into the flushing chamber 30, just sufficient kraut containing enough brine to produce a desirable and uniform mixture, being retained in the measuring chambers, to properly fill the cans 12 without wasting material. The advancing pockets 3 are then completely segregated from the basin 51 after which they are automatically brought into communication with the discharge opening 8, the plungers 4 being retained in fixed position until the entire lower open ends of the pockets 3 have been exposed to the opening 8. When this disposition of the elements is attained, the plungers 4 are automatically and rapidly lowered by means of the downwardly inclined stationary cam 39 whereby the measured charges or batches are forced from the pockets 3 into the successive cans 12 located below the pockets. The downward travel of the plungers 4 is continued by means of the topping cam portion 40 of the cam 39 until the lower plunger ends actually enter the corresponding cans 12 thus insuring delivery of all of the material into the cans and producing a smooth and neat appearance of the kraut when a can is subsequently opened. The topping operation also serves to permit effective closing of the filled cans 12 without interference by the kraut fibres. After the product has been topped, the plungers 4 are again withdrawn and the filled cans 12 are automatically delivered from the filler either to the sterilizer or to the closing machine, by means of the discharge mechanism 29.

From the foregoing description, it will be obvious that the sauer kraut is automatically bleached, flavored, conditioned, measured and delivered to the successive cans 12 to produce absolute uniformity of pack. The material may readily be handled by the machine as hot as desired in order to facilitate subsequent sterilization. By utilizing an annular series of seven measuring pockets 3 and plungers 4 of minimum size located closely adjacent to each other, the cans may be caused to travel in a circle of minimum diameter and at high speed, without producing waste of material due to the action of centrifugal force. The successive steps of the processes are carried on automatically, rapidly and effectively and the machine has an enormous capacity of product having a quality superior to that of hand packed goods. By properly regulating the quantity of brine admitted to the bath 51 through the chamber 30, the degree of bleaching and flavoring may be readily controlled to produce absolute uniformity of color and taste of the packed product, with minimum waste of brine. By segregating the measured batches of kraut from the main mass of material with the aid of finger like shredding points 32, the fibres are not cut as when a knife edge is employed, and the fluffy appearance of the packed product is retained. As the shredding points 32 operate upon the sides of the measured batches rather than upon the upper or lower ends thereof, any tearing or cutting which may result from the separation, will not be visible in the final product when the cans 12 are opened. The delivery of the fresh brine and of the excess brine from the measuring pockets 3 through the chamber 30 also serves to prevent kraut fibres from lodging in the holes 33 and upon the points 32, and further serves to additionally agitate the mixture in the bath 51. While a mechanical agitator has been disclosed, it will be obvious that the agitation may also be effected by pulsating the liquid in the bath 51, or by any other equivalent means.

The quality and other characteristics of the pack produced, with the improved filler are capable of wide range of variation due to the numerous and conveniently manipulable adjusting devices provided. The proportions of the ingredients and the weights and volumes of the measured batches may be readily varied by adjustment of the heights of the cams 36, 37, 38 with the aid of the screws 42, 44 and of the hand wheels 45, 46. When the cams 36, 37 are lowered, the initial quantities of mixture withdrawn from the bath 51, are diminished. When the cam 38 is lowered, more brine is expressed from the charges initially sucked into the measuring chambers of the pockets 3. The flavoring and coloring may be varied by regulating the quantity of fresh brine admitted and the temperature of the material is subject to ready control by the operator.

The simplicity of the structure is apparent, and practically every element may be quickly removed for cleaning and replacement without the aid of special tools. The successive plungers 3 may be freely vertically removed whereupon the element 2 is capable of free vertical removal. The cams 36, 37, 38 are also capable of vertical removal by manipulation of the screw rods 42, 44. The vertical main shaft 16 may be lifted out of place when the collar 47 is removed. The shredding points 32 may be removed with the plate 31. The element 2 is of extremely simple construction and the guide surfaces 49 effectively serve to prevent rotation of the plungers 4 about their own axes. Due to the acid in the kraut, the various elements which are exposed to direct contact with the material are preferably formed of acid resisting material, and the exterior of the machine is preferably enamelled to produce a neat and sanitary appearance. By forming the cam 35 directly upon the upper portion of the annular wall 5, the number of parts is also reduced to a minimum and manufacture of the machine is facilitated.

While the processes and the machine herein described are especially adapted to the treatment and packing of sauer kraut, it will be obvious that the same are applicable to the treatment of other fibrous products. The processes are moreover capable of exploitation by hand and with the aid of other machinery and mechanism than that herein specifically shown and described. It should be generally understood that it is not desired to limit the invention to the precise steps of the processes or to the exact details of construction herein shown and described, for various modifications within the scope of the appended claims may occur to persons skilled in the art.

It is claimed and desired to secure by Letters Patent:—

1. In combination, a source of fibrous material having liquid therein and having a discharge opening below the level of said liquid, a confined pocket movable past and communicable with said source through said opening, and a plunger in said pocket adapted to withdraw fibrous material from said source through said opening and to deliver said material from said pocket through another portion thereof, said plunger being movable beyond the lower confining wall of said pocket.

2. In combination, a measuring pocket, a plunger within said pocket, means for moving said plunger to draw material into said pocket, means for subsequently moving said plunger to compress said material, means for positioning a can adjacent to said pocket, and means for subsequently moving said plunger to discharge said material from said pocket to said can and to compress said material within said can.

3. In combination, a rotor having a series of parallel measuring pockets therein, a wall snugly fitting said rotor, a plunger movable in each of said pockets, and a cam formed integral with said wall for actuating said plungers.

4. In combination, a rotor having a series of open sided parallel measuring pockets therein, an annular wall forming a closure for said openings, a movable plunger in each of said pockets, and a cam formed integral with said wall for successively reciprocating said plungers.

5. In combination, a source of fibrous material having liquid therein, a measuring pocket formed to receive fibrous material and liquid from said source, means for separating material introduced into said pocket from the mass of material in said source, and means for delivering liquid from said pocket over said separating means to clean the latter.

6. In combination, a source of fibrous material having liquid therein, a measuring pocket movable past said source, means for drawing fibrous material and liquid from said source into said pocket, and a series of points for shredding said withdrawn material away from the mass of material in said source, said drawing means being adapted to compress said withdrawn material and to express liquid from said pocket over said points.

7. In combination, a source of fibrous material, a series of measuring pockets movable in succession past said source, a movable plunger in each of said pockets for removing material from said source by suction, means for moving said plungers to express moisture from the successive batches removed from said source, and means for subsequently moving said plungers to deliver the successive compressed batches from said pockets.

8. In combination, a rotary element having a series of measuring pockets each provided with a side and an end opening, means for transporting a succession of cans below and in alinement with said pockets, means for introducing a mixture of fibrous material and liquid into the successive pockets, and means for subsequently expressing a portion of the liquid from the mixture in each of said pockets and for subsequently delivering the material from said pockets through said end openings.

9. In combination, a pocket revoluble about an axis and having a side and an end opening, and a plunger movable in said pocket to successively draw fibrous material into said pocket through said side opening, to compress said material within said pocket, and to deliver said compressed material through said end pocket opening, said plunger being movable beyond said end opening.

10. In combination, a measuring pocket movable about a vertical axis and having a bottom discharge opening, a plunger reciprocable in said pocket, means forming an inlet to said pocket below said plunger, means for moving said plunger upwardly to draw material into said pocket through said inlet, means for moving a can with said pocket and below said discharge opening, a support for preventing movement of said can away from said opening during filling, and means for moving said plunger downwardly through said pocket and said opening and into the upper end of said can.

11. In combination, an element comprising an annular wall and a bottom plate having inlet and discharge openings respectively, rotary means within and snugly fitting said wall, said means forming a series of parallel measuring pockets successively communicable with said inlet and discharge openings, and a plunger reciprocable in each of said pockets.

12. In combination, a rotor having a series of open sided measuring pockets, an annular wall snugly fitting said rotor and providing a closure for the open sides of said pockets, said wall having an inlet opening for delivering material into said pockets in succession, an end plate normally closing the corresponding ends of said pockets and having a discharge opening for delivering material from said pockets in succession, and a plunger movable longitudinally within each of said pockets during revolution of said rotor.

13. In combination, a rotor having a series of open sided parallel measuring pockets, an annular wall snugly fitting said rotor and providing a closure for the open sides of said pockets, said wall having a single inlet opening for delivering solid material into said pockets in succession, an end plate normally closing the corresponding ends of said pockets and having a single discharge opening for delivering said material from said pockets in succession, a plunger movable in each of said pockets, and means associated with an end of said wall for moving said plungers during revolution of said rotor.

14. In combination, an element comprising an annular wall and a bottom plate each having an opening therein, a rotor snugly fitting the interior of said wall and coacting with said plate, said rotor forming an annular series of open sided pockets the open sides of which are normally closed by said wall, and said pockets being successively communicable with said openings, a plunger within each of said pockets, and means associated with an end of said wall for moving said plungers during revolution of said rotor.

15. In combination, an element comprising an annular upwardly open wall and a bottom plate closing the lower end of said wall to form a cup shaped cylindrical recess, a rotor snugly fitted within said recess and resting freely upon said bottom plate, means coacting with the lower end of said rotor for revolving the same, said rotor forming an annular series of measuring pockets partially bounded by said wall, and a plunger movable within each of said pockets, said plungers resting upon the upper end of said wall.

16. In combination, an element comprising a bottom plate and an annular wall extending upwardly from said plate, a rotor having open sided pockets normally closed by said wall, said rotor snugly fitting the interior of said wall and resting freely upon said plate, and a plunger movable within each of said pockets, said plungers resting freely upon the upper end of said wall and being movable during revolution of said rotor and said pockets.

17. In combination, a stationary element comprising a bottom plate and an annular wall extending upwardly from said plate, a rotor snugly fitting the interior of said wall and resting freely upon said plate, said rotor having an annular series of pockets partially bounded by said wall and being revolvable within said wall, a plunger movable within each of said pockets, and common means associated with the upper end of said wall for supporting and for moving said plungers during revolution of said rotor.

18. In combination, an element forming a plurality of measuring pockets, a plunger movable in each of said pockets, a casing embracing said element and having an end forming a track, and an adjustable track section cooperable with said casing track to move said plungers.

19. In combination, an element forming an annular series of measuring pockets revolvable about an axis, a plunger in each of said pockets, a cylindrical casing embracing said element and having an end surface forming a track, and an adjustable track section cooperable with said casing track to move said plungers.

20. In combination, an element forming an annular series of measuring pockets revolvable about a vertical axis and having side inlet openings, a plunger in each of said pockets, a cylindrical casing embracing said element adjacent to said openings and having an end surface forming a track, and an adjustable track section cooperable with said casing track to move said plungers during revolution of said pockets.

In testimony whereof, the signature of the inventor is affixed hereto.

OSWALD H. HANSEN.